J. W. Hatcher. Cotton Chopper & Scraper.
No. 120,274.  Patented Oct. 24, 1871.
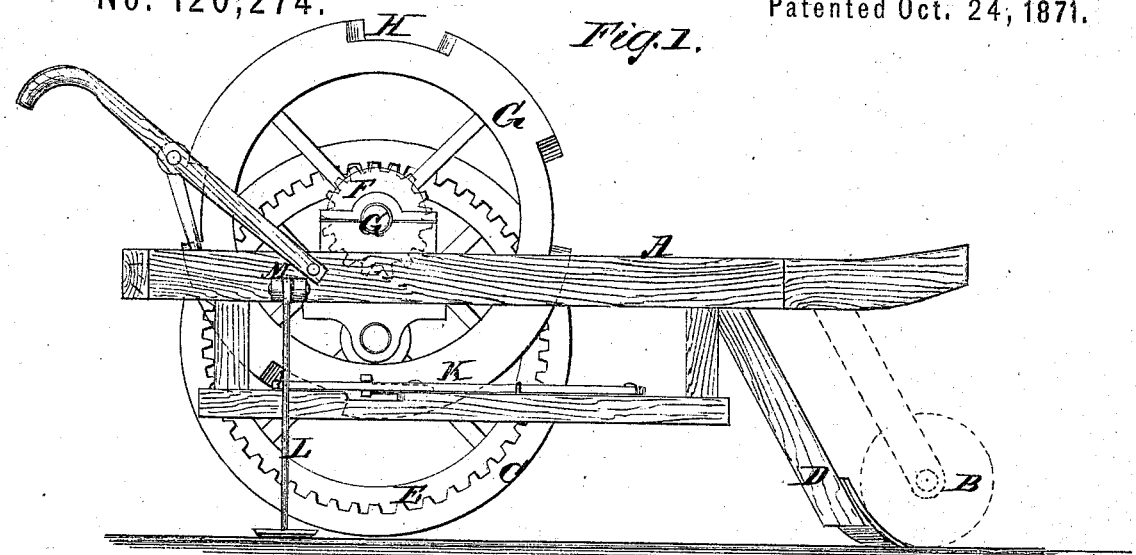
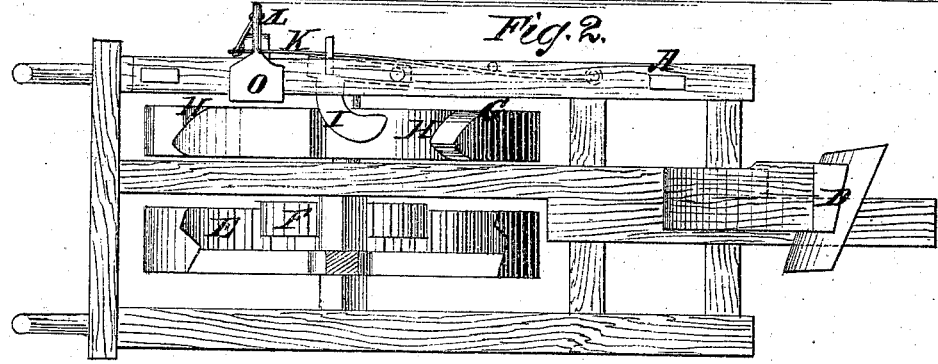
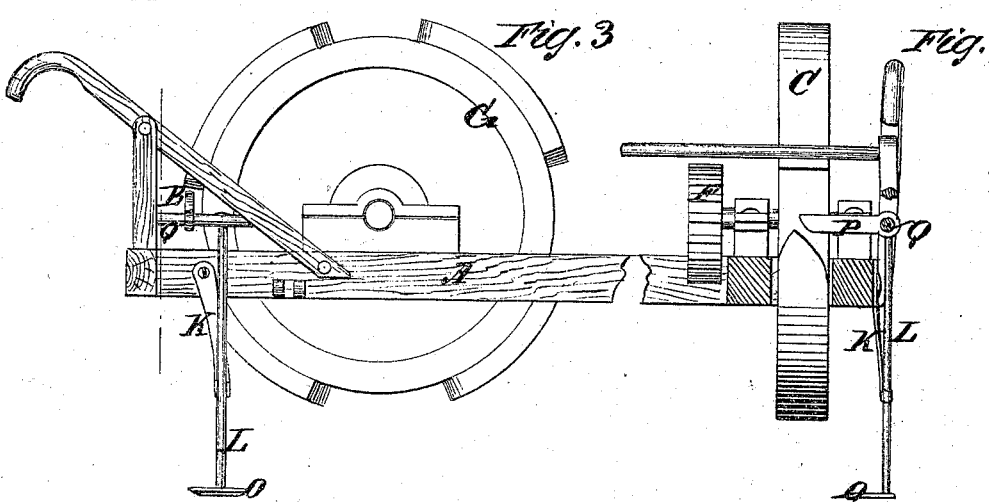 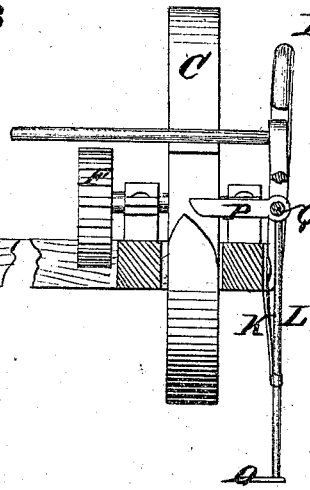
Witnesses:
John Becker.
Wm. H. C. Smith.
Inventor:
J. W. Hatcher
Per
Attorneys.

UNITED STATES PATENT OFFICE.

JULIUS W. HATCHER, OF BETHESDA, TENNESSEE.

IMPROVEMENT IN CULTIVATORS.

Specification forming part of Letters Patent No. 120,274, dated October 24, 1871.

*To all whom it may concern:*

Be it known that I, JULIUS W. HATCHER, of Bethesda, in the county of Williamson and State of Tennessee, have invented a new and Improved Cotton-Chopper and Scraper; and I do hereby declare that the following is a full, clear, and exact description thereof, which will enable others skilled in the art to make and use the same, reference being had to the accompanying drawing forming part of this specification.

This invention relates to an improvement in the class of cotton-cultivating machines in which a vibrating blade is employed to thin or cut out the cotton in the row at suitable intervals of space. The improvement consists in the arrangement of a rotating cam-wheel of suitable construction and the vibrating cutter and directly-connected parts, whereby a lighter, cheaper, and more easily-managed machine is produced than those heretofore known or used.

Figure 1 is a side elevation of my improved machine. Fig. 2 is a plan of the bottom. Fig. 3 is a partial side elevation showing a modification of some of the chopper-operating devices; and Fig. 4 is a section of Fig. 3 taken on the line *x x*.

Similar letters of reference indicate corresponding parts.

A is an ordinary rectangular frame, such as is employed for scraping and other cotton-cultivating machines. This frame is mounted at the front on a small wheel, B, and at the rear on another larger one, C. D is the scraper, which is of the ordinary sort, mounted just behind wheel C, which regulates the depth of the cutting, which may be varied by making the wheel-support variable. The large wheel C has a rim, E, of internal gears, and drives a pinion, F, at the upper side, which pinion turns a large cam-wheel, G, mounted considerably higher than wheel C. This wheel, having cams or notches H in the side with inclined planes, said notches being about as far apart as the distance it is required to chop out the cotton, acts on a pusher, I, to throw out a spring, K, ranging along the right side of the machine, and connected to the chopper-rod L, which is pivoted to the frame at M, so as to throw out the chopper O, which is then held out to the right of the row of cotton by the plane side of the wheel until the next notch comes to the pusher, which is braced into the notch, and the chopper is forced in across the row, chopping out the cotton. It is then thrown out again by the next inclined plane ready for another operation, and so on. I propose in another way to cause the inclined planes of the notches to act on an arm, P, of an oscillating shaft, Q, to which the chopper-rod L is connected, as in Fig. 3, to throw out the chopper, which will be thrown back by a spring, K, in the same manner. This plan I consider an equivalent of the other.

By this arrangement of the cam-wheel I am enabled to make the frames of cotton-choppers much shorter than they commonly are, since the chopper may be attached to the frame opposite the wheel. Thus, the use of gearing, which adds weight and increases the cost, size, and draft of such machines, without in any way enhancing, but rather lessening their efficiency, is obviated.

I do not claim a vibrating cutter or chopper, nor a cam-wheel for operating the same; but

Having thus described my invention, I claim as new and desire to secure by Letters Patent—

In a cotton-chopper, the arrangement of the cam-wheel G H, so that its axis is above that of the internally-toothed transporting-wheel C E, the same being geared together as shown, and the chopper O, rod L, spring K, and arm or rod, all as shown and described for the purpose specified.

JULIUS W. HATCHER.

Witnesses:
P. D. SCALES,
W. A. HUDSON. (43)